(12) United States Patent
Salunkhe et al.

(10) Patent No.: US 10,329,945 B2
(45) Date of Patent: Jun. 25, 2019

(54) HIGH PERFORMANCE ROBUST GAS TURBINE EXHAUST WITH VARIABLE (ADAPTIVE) EXHAUST DIFFUSER GEOMETRY

(71) Applicant: Siemens Energy, Inc., Orlando, FL (US)

(72) Inventors: Anil L. Salunkhe, Charlotte, NC (US); Bogdan R. Raica, Oviedo, FL (US); Christian K. Funk, Charlotte, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 230 days.

(21) Appl. No.: 14/691,629

(22) Filed: Apr. 21, 2015

(65) Prior Publication Data
US 2016/0312649 A1 Oct. 27, 2016

(51) Int. Cl.
| | | |
|---|---|---|
| *F02C 6/08* | (2006.01) | |
| *F02K 1/12* | (2006.01) | |
| *F02K 1/16* | (2006.01) | |
| *F01D 17/14* | (2006.01) | |
| *F01D 25/24* | (2006.01) | |
| *F01D 25/30* | (2006.01) | |
| *F04D 29/56* | (2006.01) | |
| *F04D 29/68* | (2006.01) | |

(52) U.S. Cl.
CPC ........... *F01D 17/14* (2013.01); *F01D 17/141* (2013.01); *F04D 29/563* (2013.01); *F01D 25/24* (2013.01); *F01D 25/30* (2013.01); *F02C 6/08* (2013.01); *F02K 1/12* (2013.01); *F02K 1/16* (2013.01); *F04D 29/681* (2013.01)

(58) Field of Classification Search
CPC .... F04D 29/524; F04D 29/563; F04D 29/681; F02K 1/82; F02K 1/12; F01D 17/105; F05D 2250/90; F05D 2270/65
See application file for complete search history.

(56) References Cited

U.S. PATENT DOCUMENTS

| | | | | |
|---|---|---|---|---|
| 2,831,321 A | * | 4/1958 | Laucher | F02K 1/1207 239/265.39 |
| 3,592,389 A | * | 7/1971 | Johnson | F02K 1/12 239/265.27 |
| 4,391,564 A | * | 7/1983 | Garkusha | F01D 25/30 415/126 |

(Continued)

*Primary Examiner* — Andrew H Nguyen
*Assistant Examiner* — Stephanie Cheng

(57) ABSTRACT

An exhaust gas diffuser for a gas turbine engine whose inlet geometry can be selectively controlled to change the angular orientation of the diffuser at the location where the exhaust gas exits the last stage row of blades of the turbine section of the gas turbine engine. An end portion of the gas diffuser proximate the last stage row of blades can include one or more actuated sections that are independently controlled to change the angular orientation of the inlet geometry of the diffuser. In one embodiment, the angular orientation of the actuated sections is set at the manufacturing level for the service location of the engine. In another embodiment, the angular orientation of the actuated sections is selectively controlled based on the operating conditions of the engine. In another embodiment, the angular orientation of the actuated sections is controlled by pneumatic pressure from a compressor section of the engine.

12 Claims, 5 Drawing Sheets

(56) References Cited

U.S. PATENT DOCUMENTS

| | | | | |
|---|---|---|---|---|
| 4,398,865 A * | 8/1983 | Garkusha | F01D 25/30 | 415/148 |
| 5,203,673 A * | 4/1993 | Evans | F01D 11/22 | 415/10 |
| 5,209,634 A * | 5/1993 | Owczarek | F01D 25/30 | 415/150 |
| 6,261,055 B1 * | 7/2001 | Owczarek | F01D 1/02 | 415/148 |
| 6,488,470 B1 * | 12/2002 | Owczarek | F01D 1/02 | 415/148 |
| 8,967,528 B2 * | 3/2015 | Mackin | F02C 6/08 | 244/134 R |
| 9,249,687 B2 * | 2/2016 | Nanda | F01D 11/08 | |
| 2007/0235080 A1 * | 10/2007 | Hocking | F01D 17/105 | 137/85 |
| 2008/0000235 A1 * | 1/2008 | Hanson | F01D 17/141 | 60/770 |
| 2008/0063516 A1 * | 3/2008 | Fridsma | F01D 17/14 | 415/148 |
| 2009/0266912 A1 * | 10/2009 | Gukeisen | F02K 1/1253 | 239/265.33 |
| 2010/0000220 A1 * | 1/2010 | Chaudhry | F01D 17/141 | 60/771 |
| 2010/0107600 A1 * | 5/2010 | Hillel | F01D 17/08 | 60/235 |
| 2010/0226767 A1 * | 9/2010 | Becker | F01D 9/02 | 415/207 |
| 2012/0042654 A1 * | 2/2012 | Siden | F01D 5/143 | 60/670 |
| 2013/0115044 A1 * | 5/2013 | Broker | F01D 9/02 | 415/1 |
| 2013/0121806 A1 * | 5/2013 | Beeck | F01D 25/30 | 415/1 |
| 2013/0163905 A1 * | 6/2013 | Vintinner | F16C 33/04 | 384/155 |
| 2013/0306755 A1 * | 11/2013 | Dittmann | F02K 1/1207 | 239/265.25 |
| 2013/0343866 A1 * | 12/2013 | Christians | F01D 17/141 | 415/1 |
| 2014/0178191 A1 * | 6/2014 | Vijayan | F01D 17/143 | 415/207 |
| 2014/0263737 A1 * | 9/2014 | Pierluissi | F02K 1/1207 | 239/265.39 |
| 2015/0143810 A1 * | 5/2015 | Salunkhe | F01D 25/30 | 60/772 |
| 2015/0211441 A1 * | 7/2015 | Moon | F02K 1/386 | 60/262 |
| 2016/0258438 A1 * | 9/2016 | Johnson | F04D 15/0027 | |
| 2017/0023014 A1 * | 1/2017 | Clemen | F01D 9/02 | |

* cited by examiner

HIGH PERFORMANCE ROBUST GAS TURBINE EXHAUST WITH VARIABLE (ADAPTIVE) EXHAUST DIFFUSER GEOMETRY

BACKGROUND OF THE INVENTION

Field of the Invention

This invention relates generally to an exhaust gas diffuser for a gas turbine engine and, more particularly, to an exhaust gas diffuser for a gas turbine engine, where the angular orientation of inlet geometry of the exhaust gas diffuser proximate the last row of blades in the engine is adjustable relative thereto.

Discussion of the Related Art

The world's energy needs continue to rise which provides a demand for reliable, affordable, efficient and environmentally-compatible power generation. A gas turbine engine is one known machine that provides efficient power, and often has application for an electric generator in a power plant, or engines in an aircraft or a ship. A typical gas turbine engine includes a compressor section, a combustion section and a turbine section. The compressor section provides a compressed airflow to the combustion section where the air is mixed with a fuel, such as natural gas. The combustion section includes a plurality of circumferentially disposed combustors that receive the fuel to be mixed with the air and ignited to generate a working gas. The working gas expands through the turbine section and is directed across turbine blades therein by associated vanes. As the working gas passes through the turbine section, it causes the blades to rotate, which in turn causes a shaft to rotate, thereby providing mechanical work.

The turbine section of a typical gas turbine engine will include a plurality of rows of circumferentially disposed blades, such as four rows of blades, where the working gas is directed by a row of vanes across the blades from one stage of the blades to the next stage of the blades. It is generally desirable that the outer tip of the rotating blades be as close as possible to the static casing surrounding the blades, referred to in the art as tip clearance, so that a maximum amount of the working gas as possible flows around the blades instead of flowing between the blades and the casing, which does not contribute to rotation of the blades, to provide improved blade performance. As the temperature of the engine goes up and down, the blades and casings expand and contract accordingly, which changes the tip clearance. Also, the centrifugal force from rotation of the blades causes the length of the blades to increase, which reduces the tip clearance. It is generally the tip clearance of the blades at system steady state operation that determines the performance of the blades and therefore of the engine. On the other hand, the tip clearances are also crucial in ensuring that the blades don't rub with static hardware during the startup and shutdown of the engine because of different thermo-mechanical expansions and/or contractions of blades and casings. Thus, tip clearances are set appropriately in an engine so as to derive the best performance and prevent tip rubbing.

At the output of the turbine section, the working gas is passed through an exhaust diffuser section that modulates the back pressure of the exhausted gas for optimal performance of the turbine section. The exhausted gas, which is still very hot, is often times directed to other systems that may benefit from the available heat until the working gas is eventually exhausted to the environment or otherwise. For example, the hot working gas at the output of the gas turbine engine may be used to boil water for a steam turbine engine, which also generates power in, for example, a combined cycle plant, well known to those skilled in the art. The configuration of the exhaust gas diffuser at the output of the gas turbine engine is important for the performance of the gas turbine blades because the exhaust gas diffuser partially blocks the gas flow from the turbine section.

The performance of an exhaust gas diffuser is measured by its coefficient of pressure recovery. More particularly, an exhaust gas diffuser converts kinetic energy in the exhaust gas into potential energy, where the exhaust gas diffuser acts to reduce the speed of the working gas, preferably to zero speed so that all of the kinetic energy in the working gas is converted to a pressure. The angular orientation of the exhaust gas diffuser at its inlet geometry proximate the last row of blades is important for adequately collecting the working gas, which contributes to the performance of the exhaust gas diffuser. It is known that as the tip clearance of the last row of blades in the engine is reduced to be less than some threshold clearance, where reducing the tip clearance continues to increase the performance of the blades, the performance of the exhaust gas diffuser is reduced. Thus, for very small tip clearances, the ability of the exhaust gas diffuser to provide pressure recovery of the exhaust gas is reduced. Therefore, the combination of the last stage blade tip clearance and the angle of the inlet geometry of the exhaust gas diffuser is a critical contributor to optimal engine performance and efficiency.

The inlet geometry of most exhaust gas diffusers have a fixed angle that is set for optimal performance for a general ambient temperature operating condition of the engine. However, that angular orientation of the exhaust gas diffuser may only be optimal for an average ambient temperature and not be optimal for the typical ambient temperature of the service location of the engine. More particularly, when a gas turbine engine operates at an off-design condition, such as cold or hot day or part load, two effects can be discerned, namely, the running blade tip clearance deviates from its optimum clearance and flow conditions change. These two effects degrade system performance.

SUMMARY OF THE INVENTION

The present disclosure describes an exhaust gas diffuser for a gas turbine engine whose inlet geometry can be selectively controlled to change the angular orientation of the diffuser at the location where the exhaust gas exits the last stage row of blades of the turbine section of the gas turbine engine. For example, an end portion of the exhaust gas diffuser proximate the last stage row of blades can include one or more actuated sections that are independently controlled to change the angular orientation of the inlet geometry of the diffuser. In one embodiment, the angular orientation of the actuated sections is set at the manufacturing level for the service location of the engine. In another embodiment, the angular orientation of the actuated sections is selectively controlled based on the operating conditions of the engine. In yet another embodiment, the angular orientation of the actuated sections is controlled by pneumatic pressure from a compressor section of the engine.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an exhaust gas diffuser for a gas turbine engine including a configurable inlet geometry is merely exemplary in nature, and is in no way intended to limit the invention or its applications or uses. For example, the exhaust gas diffuser has specific application for a gas turbine engine. However, the exhaust gas diffuser may have application for other types of engines.

Figure 1:
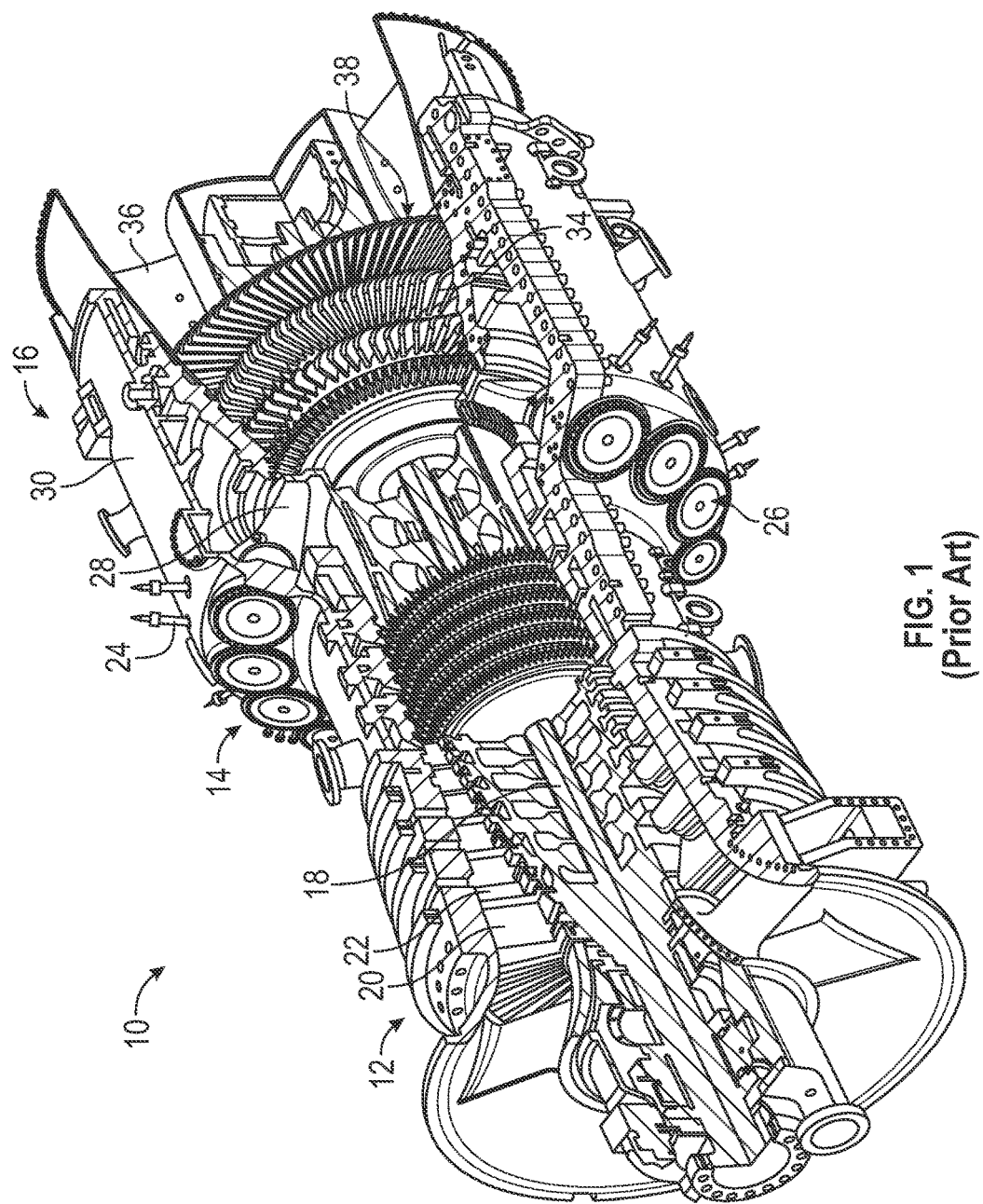
FIG. 1 is a cut-away, isometric view of a known gas turbine engine.

FIG. 1 is a cut-away, isometric view of a known gas turbine engine 10 including a compressor section 12, a combustion section 14 and a turbine section 16 all enclosed within an outer housing or casing 30, where operation of the engine 10 causes a central shaft or rotor 18 to rotate, thus creating mechanical work. The engine 10 is illustrated and described by way of a non-limiting example to provide context to the invention discussed below. Those skilled in the art will appreciate that other gas turbine engine designs can also be used in connection with the invention. Rotation of the rotor 18 draws air into the compressor section 12 where it is directed by vanes 22 and compressed by rotating blades 20 to be delivered to the combustion section 14, where the compressed air is mixed with a fuel, such as natural gas, and where the fuel/air mixture is ignited to create a hot working gas. More specifically, the combustion section 14 includes a number of circumferentially disposed combustors 26 each receiving the fuel that is injected into the combustor 26 by an injector (not shown), mixed with the compressed air and ignited by an igniter 24 to be combusted to create the working gas, which is directed by a transition component 28 into the turbine section 16. The working gas is then directed by circumferentially disposed stationary vanes (not shown in FIG. 1) in the turbine section 16 to flow across circumferentially disposed rotatable turbine blades 34, which causes the turbine blades 34 to rotate, thus rotating the rotor 18. Once the working gas passes through the turbine section 16 it is output from the engine 10 as an exhaust gas through an output nozzle 36 generally representing an exhaust gas diffuser as discussed below.

Each group of the circumferentially disposed stationary vanes defines a row of the vanes and each group of the circumferentially disposed blades 34 defines a row 38 of the blades 34. In this non-limiting embodiment, the turbine section 16 includes four rows 38 of the rotating blades 34 and four rows of the stationary vanes in an alternating sequence. In other gas turbine engine designs, the turbine section 16 may include more or less rows of the turbine blades 34. It is noted that the most forward row of the turbine blades 34, referred to as the row 1 blades, and the vanes, referred to as the row 1 vanes, receives the highest temperature of the working gas, where the temperature of the working gas decreases as it flows through the turbine section 16.

Figure 2:
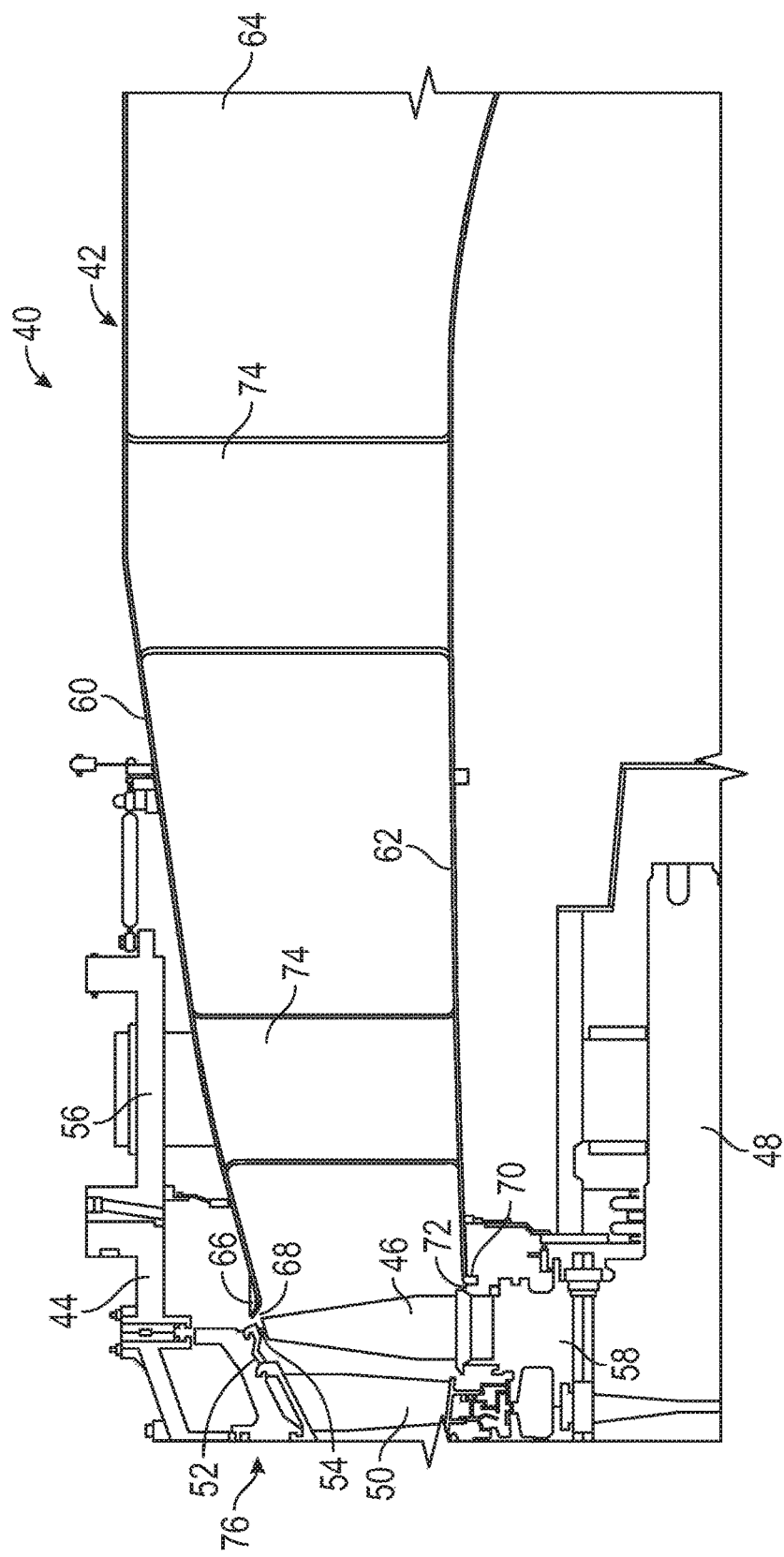
FIG. 2 is a cut-away, cross-sectional type view of a portion of a known exhaust gas diffuser associated with a gas turbine engine.

FIG. 2 is a cut-away, cross-sectional type view of a portion of a turbine section 76 and a portion of an exhaust gas diffuser 42 for a known gas turbine engine 40 similar to the gas turbine engine 10. The gas turbine engine 40 includes an outer casing 44 having a special configuration for the particular engine and includes an exhaust casing 56 to which the diffuser 42 is mounted. The turbine section 74 of the gas turbine engine 40 also includes a last row of blades 46 each being mounted to a disk 58, which in turn is mounted to a rotor 48 in a known manner, where the blades 46 are positioned relative to a last stage row of vanes 50 that directs the working gas across the blades 46. An end of each blade 46 opposite to the disk 58 is positioned proximate to a ring segment 52 and defines a tip clearance 54 therebetween as discussed above. The exhaust gas diffuser 42 includes an exhaust diffuser outer liner 60 and an exhaust diffuser inner liner 62 defining a chamber 64 therebetween through which the exhaust gas flows. The exhaust gas diffuser 42 also includes a number of exhaust diffuser liner struts 74 that provide support between the liners 60 and 62. An end portion 66 of the outer liner 60 is positioned proximate to the end of the blades 46 and defines a gap 68 therebetween so as to allow the blades 46 to rotate relative to the exhaust gas diffuser 42. Likewise, an end portion 70 of the inner liner 62 is positioned proximate to the location where the blades 46 attach to the disks 58 and also defines a gap 72 therebetween.

As discussed above, the tip clearance 54 is an important factor to define the performance of the blades 46 and the angular orientation of the end portion 66 relative to the blades 46 is an important factor to define the performance of the exhaust gas diffuser 42, where the optimal performance of the engine 40 includes an optimal combination of these two blade and diffuser performances. As also mentioned above, as the tip clearance 54 is reduced beyond some minimal tip clearance, the performance of the exhaust gas diffuser 42 is reduced. By varying the inlet geometry of the exhaust gas diffuser 42 based on system operating conditions and/or ambient temperature, the performance based on the coefficient of pressure of the diffuser 42 can be changed to correct for and restore optimal system performance.

As will be discussed in detail below, the present invention proposes modifying the known exhaust gas diffuser 42 so that the angular orientation of the end portion 66 can be selectively changed depending on various factors, such as the general ambient temperature at the service location of the gas turbine engine 42, the operating conditions of the gas turbine engine 42, etc., so that the optimal performance of the gas turbine engine 40 can be corrected and maintained. In a first embodiment, the modified exhaust gas diffuser includes a semi-fixed inlet geometry that can be selectively adjusted at the manufacturing facility to a particular angular orientation depending on the final operating location of the gas turbine engine. In a second embodiment, the modified exhaust gas diffuser includes actuatable exhaust gas diffuser elements that can be selectively positioned to change the angular orientation of the inlet geometry during operation of the gas turbine engine for different ambient temperatures and operating conditions over the life of the engine, where the diffuser elements can be actuated mechanically, hydraulically, pneumatically, etc. In a third embodiment, the angular orientation of the inlet geometry of the exhaust gas diffuser is controlled by pressure from the compressor section of the gas turbine engine. In a typical gas turbine engine, some of the airflow from the compressor section of the engine is directed to the turbine section to provide cooling air at desired locations, such as for the turbine blades. The compressed air is provided to a number of cavities in the compressor section and the pressure of the air in those cavities is directly related to the ambient temperature around the engine. That change in pressure in these cavities can be used to control the orientation of the end portion of the exhaust gas diffuser.

Figure 3:
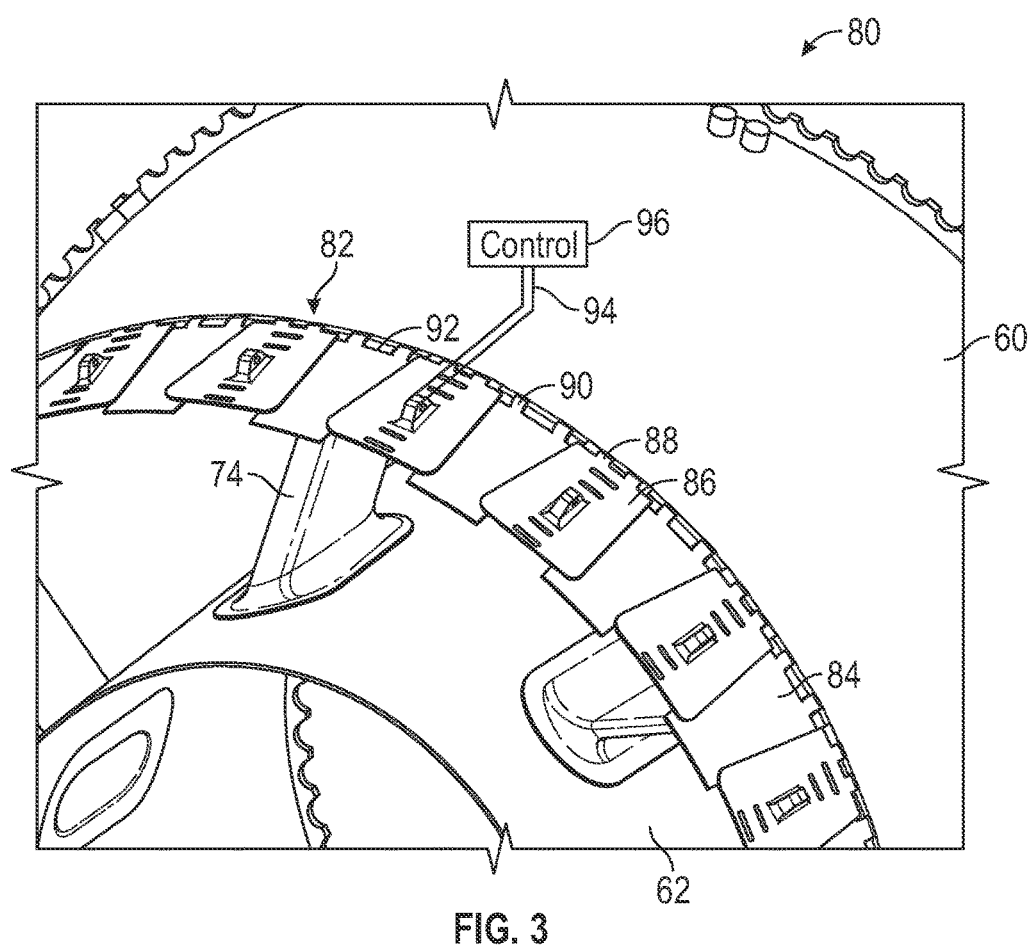
FIG. 3 is a cut-away, isometric view of an exhaust gas diffuser separated from a gas turbine engine and showing actuated diffuser elements.

FIG. 3 is a cut-away, isometric view of an exhaust gas diffuser 80 similar to the exhaust gas diffuser 42, where like elements are identified by the same reference number, showing one non-limiting example of the second embodiment referred to above for the actuated diffuser element design. In this embodiment, the end portion 66 is replaced with an actuation ring 82 including a plurality of alternating non-actuated sections 84 and actuated diffuser flap sections 86, where side edges of the actuated diffuser sections 86 lay on top of adjacent side edges of the non-actuated sections 84 to prevent gas leakage therebetween, as shown. Each of the actuated diffuser sections 86 include a hinge 88 and each of the non-actuated sections 84 include a hinge 90 that are mounted to a circular rod 92 circumferentially disposed about an end of the outer liner 60. In one embodiment, pairs of a non-actuated section 84 and an actuated section 86 are coupled together so that when the actuated section 86 in a particular pair is actuated on the hinge 88 its associated non-actuated section 84 is also actuated in unison therewith. In this design, the sections 86 are configured to be lifted up from their home position so as to change the angular orientation of the ring 82 relative to the last row of the turbine blades (not shown in FIG. 3).

The present invention contemplates any suitable technique for performing the actuation operation of the actuated sections 86 in a controlled manner by a suitable operator or otherwise. Generally, each of the actuated sections 86 will be coupled to a suitable linkage 94, such as those discussed below, and the linkage 94 will be coupled to a suitable control mechanism, represented generally as box 96. By selectively drawing the linkage 94 depending on engine operating conditions and/or ambient temperature, the actuated diffuser sections 86 and non-actuated sections 84 will be lifted to a desired orientation, thus increasing the angular orientation of the inlet geometry of the diffuser 80 relative to the turbine blades. Therefore, as the tip clearance of the blades may change, which could affect the performance of the exhaust gas diffuser 80, the change in the angular orientation of the inlet geometry of the diffuser 80 will restore the optimal performance. Although only one linkage 94 is shown attached to one of the actuated diffuser sections 86, in a typical configuration, all of the actuated sections 86 will includes a linkage and all of the pairs of the actuated sections 86 and the non-actuated sections 84 will be raised and lowered in unison so that the entire circumferential opening of the actuation ring 82 is reconfigured.

Figure 4:
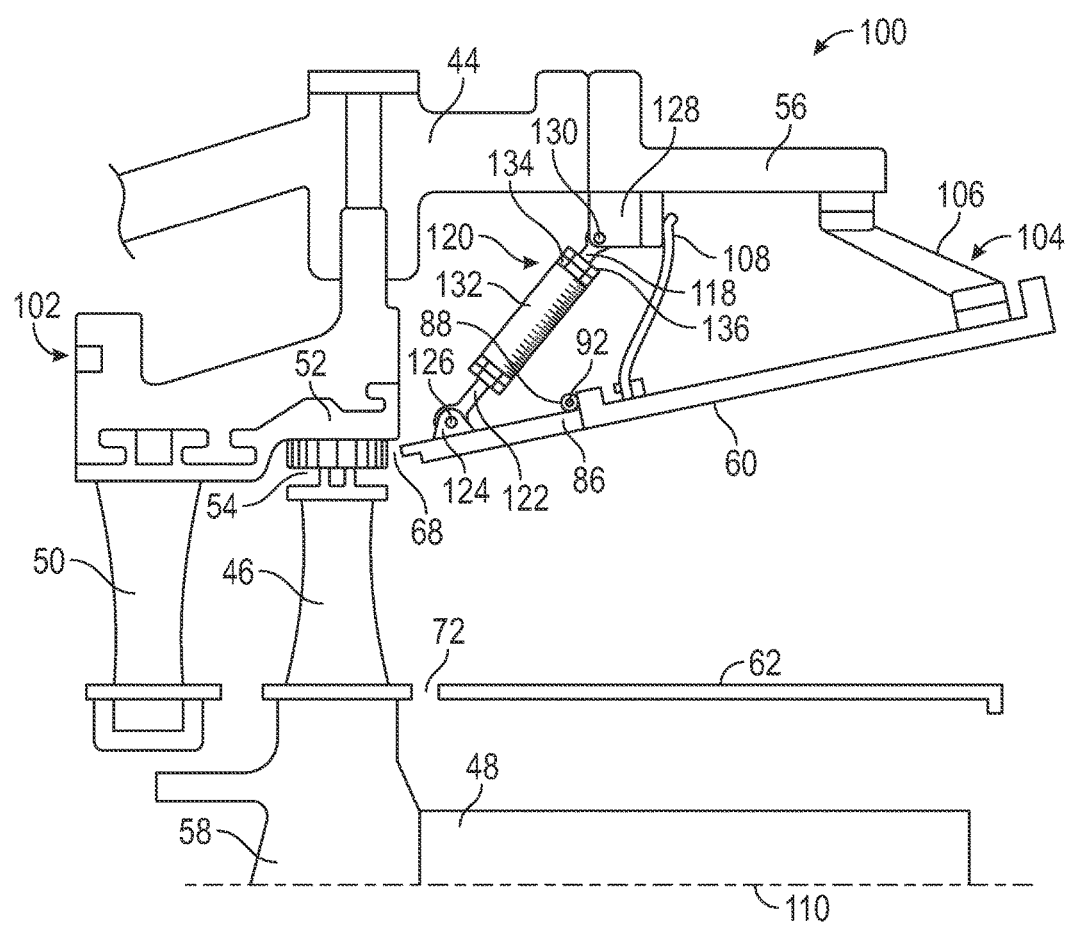
FIG. 4 is a cut-away, cross-sectional type view of an end portion of a gas turbine engine including a turbine section and an exhaust gas diffuser.

FIG. 4 is a cut-away, cross-sectional type view of an end portion of a gas turbine engine 100 including a turbine section 102 and an exhaust gas diffuser 104, where like elements to the gas turbine engine 40 and the exhaust gas diffuser 80 are identified by the same reference number, showing one non-limiting example of the semi-fixed exhaust gas diffuser for the first embodiment referred to above. The engine 100 includes an exhaust baffle seal 108 and a support link 106 both coupled to the outer liner 60 and the exhaust casing 56, as shown. It is noted that only a single one of the actuated sections 86 is shown with the understanding that there are a number of circumferentially disposed sections 86, where each of the actuated sections 86 will include an associated non-actuated section 84 coupled thereto, and where pairs of the non-actuated sections 84 and the actuated sections 86 are configured around the end portion of the diffuser 104 in the same manner as the diffuser 80. It is further noted that the engine 100 has axial symmetry about line 110.

The angular orientation of the actuated sections 86 relative to the blades 46 is controlled by an actuation assembly 120 for each actuated section 86, where the assembly 120 includes a lower rod 122 and an upper rod 118. One end of the lower rod 122 is pivotally mounted to a clevis 124 including a pin 126 secured to the actuated section 86 and one end of the upper rod 118 is pivotally mounted to a clevis 128 including a pin 130 secured to the casing 56. The opposite ends of the rods 118 and 122 are threaded into an internally threaded bushing 132. Opposing jam nuts 134 and 136 at each end of the bushing 132 lock the rods 118 and 122 at a certain threaded distance within the bushing 132 that allows the length of the assembly 120 to be adjusted to control the angular orientation of the actuated sections 86. More particularly, as the bushing 132 is rotated, the ends of the rods 118 and 122 in the bushing 132 are drawn closer together, which acts to raise the actuated section 86. The bushing 132 includes a scale that can be used to set the angle of the actuated section 86. In this manner, the angular orientation of the inlet geometry of the diffuser 104 can be set at the manufacturing level of the engine 100 for the particular location that the engine is going to be in service at in order to properly set the performance of the diffuser 104 and the performance of the engine 100.

Figure 5:
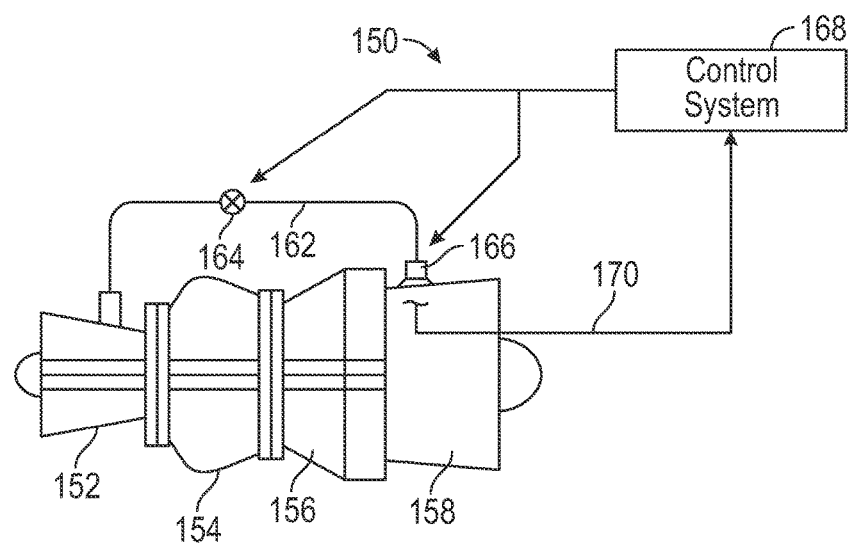
FIG. 5 is simplified top view of a gas turbine engine including a compressor section, a combustion section and a turbine section.

FIG. 5 is simplified top view of a gas turbine engine 150 including a compressor section 152, a combustion section 154 and a turbine section 156 of the type discussed above. The engine 150 also includes an exhaust gas diffuser 158 extending from the turbine section 156 that is suitable for the pressure-actuated third embodiment referred to above, where the exhaust gas diffuser 158 may include a variation of the non-actuated sections 84 and the actuated sections 86 discussed above. In order to control the position of the sections 86 based on the operating conditions of the engine 150, bleed air from the compressor section 152 is provided on line 162 to the exhaust gas diffuser 158 through a valve 164, where the line 162 is coupled to a bleed orifice 166 at the diffuser 158. The pressure provided at the bleed orifice 166 is scheduled or controlled by an engine control system 168 that controls the valve 164 and the bleed orifice 166. The scheduling relates the engine bleed pressure to the position of the actuated sections 86. Sensors (not shown) detect the position of the actuated sections 86 and provide a position signal to the control system 168 on line 170. As the engine load changes, the control system 168 adjusts the actuated sections 86 by the engine-supplied air pressure to increase or decrease the angle of the actuated sections 86. The specific configuration and orientation and the manner in which the compressor air is provided to the exhaust gas diffuser would be design specific.

Figure 6:
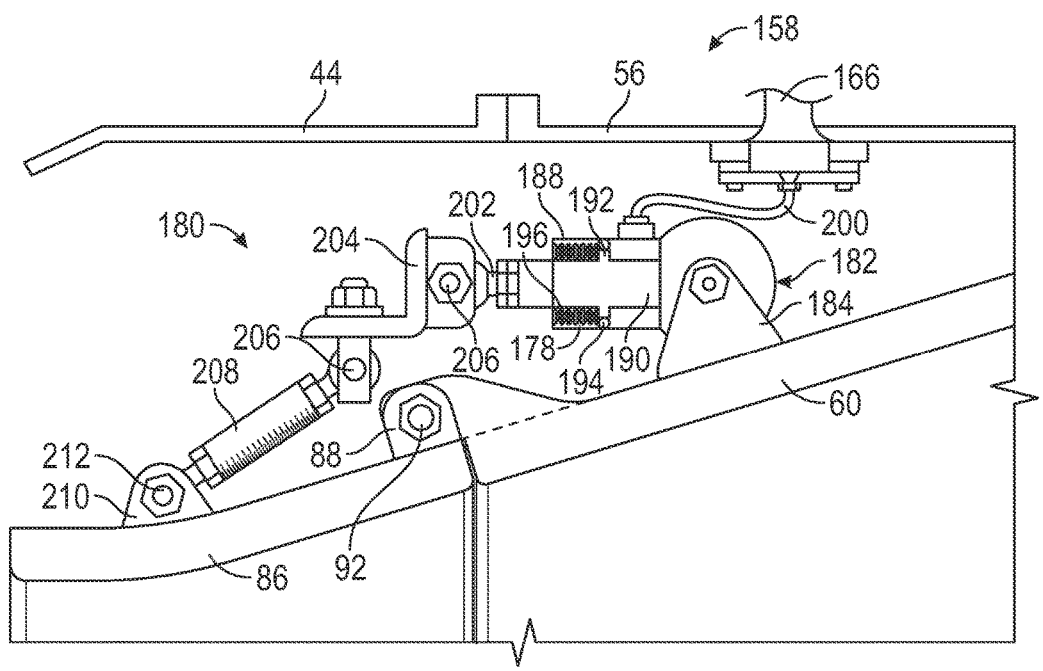
FIG. 6 is an isometric view of an exhaust gas diffuser including pneumatic control.

FIG. 6 is a cut-away portion of the exhaust gas diffuser 158 showing one non-limiting example for this embodiment, where like elements to the exhaust gas diffusers 40 and 80 are identified by the same reference number. The exhaust gas diffuser 158 includes a control assembly 180 for each actuated section 86, where the assembly 180 includes a pneumatic actuator 182 mounted to the outer liner 60 by a clevis 184. The pneumatic actuator 182 includes a piston housing 188 defining a piston chamber 178 in which is positioned a piston 190, where the piston 190 includes an outer annular member 192 having a seal 194 positioned against an inner wall of the housing 188. Control springs 196 are positioned against the annular member 192 and the inner wall of the housing 188 and provide a bias against the control pressure to return the piston 190 to a home position, where the actuated section 86 is at its smallest angle. A pneumatic control line 200 is coupled to the bleed orifice 166 and the housing 188 to provide the pressure to the chamber 178 to move the piston 190 against the bias of the springs 196. One end of a piston rod 202 is coupled to an end of the piston 190 and extends from the housing 188 and an opposite end of the rod 202 is rigidly coupled to an L-shaped ring element 204 by rod 206, where the ring element 204 extends around the circumference of the diffuser 158. One end of a linkage 208 is pivotally mounted to the ring element 204 and an opposite end of the linkage 208 is pivotally mounted to the actuated section 86 by a clevis 210 including a pin 212. Control air provided to the pneumatic actuator 182 sets the position of the piston 190 within the housing 188, which controls the position of the rod 202 extending therefrom. As the rod 202 is pushed away from the housing 188, the ring element 204 pushes on the linkage 208 causing the actuated section 86 to be raised.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A gas turbine engine, comprising:
   at least one row of a plurality of blades that rotate about an axis of the gas turbine in response to receiving a working gas, each blade including a tip positioned proximate to a static portion of the gas turbine engine and defining a tip clearance therebetween, and
   an exhaust gas diffuser comprising an outer liner defining an outer boundary of an exhaust gas flow including a fixed portion that increases in diameter from an upstream end of the fixed portion along an axial length of the outer liner and an end portion at the upstream end of the fixed portion that is positioned proximate to the tips of the plurality of blades and defines a gap therebetween, said end portion including
      a plurality of circumferentially disposed actuated sections that are movable to control an angular orientation between the end portion and the plurality of blades, and a plurality of circumferentially disposed non-actuated sections,
      wherein each actuated section includes a downstream end pivotally coupled to the upstream end of the fixed portion and a movable upstream end disposed proximate to the tips of the plurality of blades,
      wherein the angular orientation of the plurality of actuated sections is selectively controlled based on the ambient temperature by moving the movable upstream ends of the plurality of actuated sections disposed proximate to the tips of the plurality of blades.

2. The gas turbine engine according to claim 1 wherein the angular orientation of the plurality of actuated sections is selectively controlled by pneumatic pressure from a compressor section of the gas turbine engine.

3. The gas turbine engine according to claim 1 wherein the plurality of actuated sections are actuated in unison to control the angular orientation of the end portion.

4. The gas turbine engine according to claim 3 wherein the plurality of actuated sections and the plurality of non-actuated sections are arranged in an alternating sequence.

5. The gas turbine engine according to claim 4 wherein each of the plurality of non-actuated sections is mounted to an actuated section of the plurality of actuated sections and is movable therewith.

6. The gas turbine engine according to claim 3 wherein each of the plurality of actuated sections includes a hinge and each of the plurality of non-actuated sections includes a hinge, each hinge of the plurality of actuated sections and the plurality of non-actuated sections being mounted to a circular rod circumferentially disposed about the outer liner, and wherein each of the plurality of actuated section is actuated to pivot about the hinge.

7. The gas turbine engine according to claim 3 further comprising a control assembly including a linkage, said control assembly controlling the angular orientation of the plurality of actuated sections using the linkage.

8. The gas turbine engine according to claim 7 wherein the control assembly includes a pneumatic actuator having a piston slidably mounted in a piston housing, said piston housing being responsive to a pneumatic pressure from a compressor section of the gas turbine engine that controls the position of the piston, said linkage being mounted to the piston so that the position of the piston controls the angular orientation of the plurality of actuated section.

9. The gas turbine engine, according to claim 1, wherein the end portion of the outer liner is adapted as an actuation ring positioned proximate to the tips of the plurality of blades and defining the gap therebetween, said actuation ring including the plurality of actuated sections and the plurality of non-actuated sections pivotally mounted to the outer liner in an alternating sequence, wherein side edges of the plurality of actuated sections lay on top of adjacent side edges of the plurality of non-actuated sections to prevent gas leakage therebetween.

10. The gas turbine engine according to claim 1, wherein bleed air from a compressor section of the gas turbine engine is provided to the exhaust gas diffuser through a valve and a bleed orifice, wherein pressure provided at the bleed orifice is controlled by a control system, and wherein the control system adjusts the plurality of actuated sections by the pressure to increase or decrease the angular orientation of the plurality of actuated sections.

11. A gas turbine engine comprising:
   a rotatable shaft provided along an axis of the gas turbine engine;
   a compressor section responsive to a working fluid and being operable to compress the working fluid to produce a compressed working fluid;
   a combustion section in fluid communication with the compressor section that receives the compressed working fluid, said combustion section including a plurality of combustors that mix the compressed working fluid with a fuel and combust the compressed working fluid and fuel mixture to produce a hot working fluid;
   a turbine section in fluid communication with the combustion section, said turbine section including a plurality of rows of blades that rotate about the axis of the gas turbine engine in response to the hot working fluid to produce mechanical power through rotation of the shaft, each blade of the plurality of rows of blades including a tip positioned proximate to a static portion of the gas turbine engine and defining a tip clearance therebetween; and a diffuser fixed to the static portion of the gas turbine engine and receiving the hot working fluid from the turbine section, said diffuser including an outer liner defining an outer flow boundary of the hot working fluid and increasing in diameter from an upstream end of the outer liner along an axial length, the outer liner having an end portion pivotally coupled to the upstream end of the outer liner and positioned proximate to the tips of the blades in a last row of the plurality of rows of blades in the turbine section to define a gap therebetween, said end portion including a plurality of circumferentially disposed actuated sections that are operable to be actuated to move the end portion so as to control an angular orientation between the end portion and the blades in the last row, and a plurality of circumferentially disposed non-actuated sections, wherein each of the plurality of actuated sections includes a hinge and each of the plurality of non-actuated sections includes a hinge, each hinge of the plurality of actuated sections and the plurality of non-actuated sections being mounted to a circular rod circumferentially disposed at the upstream end of the outer liner, wherein the angular orientation of the plurality of actuated sections is selectively controlled based on operating conditions of the gas turbine engine such that when the operating condition causes the tip clearance to change the performance of the diffuser, the angular orientation of the upstream end portion restores the optimal performance of the diffuser, and wherein bleed air from the compressor section is provided to the diffuser through a valve and a bleed orifice, wherein pressure provided at the bleed orifice is controlled by a control system, and wherein the control system adjusts the plurality of actuated sections by the pressure to increase or decrease the angular orientation of the plurality of actuated sections.

12. A gas turbine engine, comprising:

an outer casing;

a row of rotating blades rotating about an axis of the gas turbine engine, each rotating blade including a tip and defining an axial flow direction through the rotating blades;

an exhaust diffuser outer liner fixedly coupled to the outer casing and defining an inlet edge, an outlet edge downstream of the inlet edge in the flow direction, and an outer boundary for an exhaust gas flow therebetween, wherein a diameter of the exhaust diffuser outer liner increases from an inlet edge diameter at the inlet edge along an axial length in the flow direction;

a plurality of circumferentially disposed actuated sections each comprising a downstream end pivotally coupled to the inlet edge of the exhaust diffuser outer liner and including a movable upstream end positioned proximate to the tips of the rotating blades to define an exhaust diffuser inlet diameter;

and an actuator coupled to the outer casing and the actuated sections, the actuator operable to pivot the actuated sections to vary the exhaust diffuser inlet diameter based on ambient temperature.

\* \* \* \* \*